United States Patent
Vaysman et al.

(10) Patent No.: US 10,193,883 B2
(45) Date of Patent: Jan. 29, 2019

(54) SYSTEMS AND METHODS FOR PRODUCT AUTHENTICATION

(71) Applicant: Aintu Inc., San Jose, CA (US)

(72) Inventors: Arthur Vaysman, San Jose, CA (US); Vanintheran Moodley, San Jose, CA (US)

(73) Assignee: Aintu Inc., Sunnyvale, CA (US)

( * ) Notice: Subject to any disclaimer, the term of this patent is extended or adjusted under 35 U.S.C. 154(b) by 117 days.

(21) Appl. No.: 15/283,262

(22) Filed: Sep. 30, 2016

(65) Prior Publication Data
US 2017/0093847 A1    Mar. 30, 2017

Related U.S. Application Data

(60) Provisional application No. 62/234,659, filed on Sep. 30, 2015.

(51) Int. Cl.
- *H04L 29/06* (2006.01)
- *G06F 17/30* (2006.01)
- *G06K 7/14* (2006.01)
- *H04W 12/06* (2009.01)

(52) U.S. Cl.
CPC .... *H04L 63/0853* (2013.01); *G06F 17/30864* (2013.01); *G06K 7/1413* (2013.01); *H04W 12/06* (2013.01); *H04L 63/0876* (2013.01)

(58) Field of Classification Search
CPC .... G06F 21/30; G06F 21/31; G06F 17/30864; G06K 7/1413; H04W 12/06; H04W 12/08; H04L 63/0876; H04L 63/08; H04L 63/10; H04L 63/0853; H04L 63/0861
USPC .................................................. 726/2–8, 27–30
See application file for complete search history.

(56) References Cited

U.S. PATENT DOCUMENTS

| | | | | |
|---|---|---|---|---|
| 8,249,350 | B2 * | 8/2012 | Voloshynovskyy | G07D 7/005 283/113 |
| 8,566,598 | B2 * | 10/2013 | Goodman | H04L 9/3247 713/179 |
| 9,432,337 | B2 * | 8/2016 | Kunin | H04L 63/0428 |
| 9,473,303 | B2 * | 10/2016 | Hedtke | G06Q 30/018 |
| 2015/0269570 | A1 * | 9/2015 | Phan | G06Q 20/3276 705/71 |

\* cited by examiner

*Primary Examiner* — Hosuk Song
(74) *Attorney, Agent, or Firm* — HM Law Group LLP; Vani Moodley, Esq.

(57) ABSTRACT

The present invention relates to both systems and methods for product authentication. Unique identifiers are associated with products. Said identifiers are captured through a camera of the client device and transmitted to authentication server; whereupon said authentication server authenticates the products by contacting an authentication database would manufacturer-provided authentication information.

19 Claims, 7 Drawing Sheets

| ID | SKU | Product description | Image | # scans | Who scans? | Location | When |
|---|---|---|---|---|---|---|---|
| 100 | 102 | 104 | 106 | 108 | 110 | 112 | 114 |
| | | | | | | | |

FIG. 9

| Scan # | Location |  |
|--------|----------|--|
| 1 | Store ID |  |
| 2 | Store ID |  |
| 3 | Zip |  |
| ⋮ | ⋮ |  |

Product # (SKU) 122

120 → Scan #

FIG. 10

SYSTEMS AND METHODS FOR PRODUCT AUTHENTICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights.

TECHNICAL FIELD

Embodiments of the present invention relate to methods and systems for product authentication.

BACKGROUND

The sale of counterfeit and pass off goods is a huge problem around the world. All types of goods are susceptible, including: pharmaceuticals, clothing, cosmetics, computer products, alcohol, etc. Closely related to the problem of counterfeit goods, is the problem of gray market goods. In the case of the latter, an authentic product is sold in a market that is not authorized or explicitly forbidden by the manufacturer said product.

SUMMARY

The present invention relates to both systems and methods for product authentication. Unique identifiers are associated with products. Said identifiers are captured through a camera of the client device and transmitted to authentication server; whereupon said authentication server authenticates the products by contacting an authentication database would manufacturer-provided authentication information.

BRIEF DESCRIPTION OF THE FIGURES

FIG. 9 shows an example of stored information about a product, in accordance with one embodiment of the invention.

FIG. 10 shows an example of the table providing records for each scan, in accordance with one embodiment of the invention.

DETAILED DESCRIPTION OF SOME EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Figure 1:
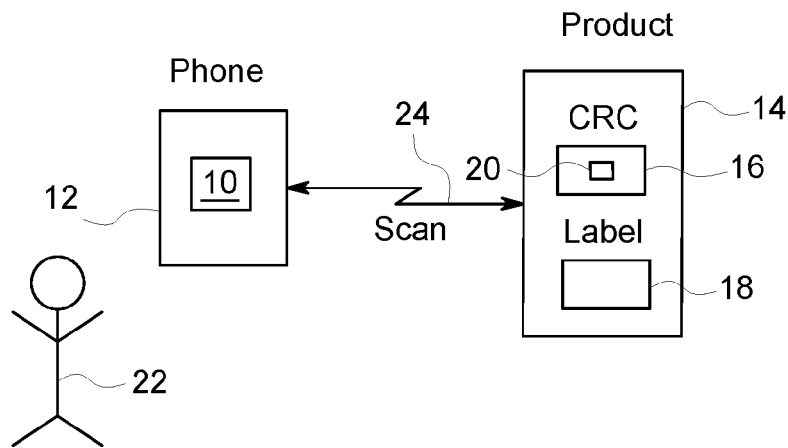
FIG. 1 shows a setup in which a mobile device provisioned with a client authentication application may be used to perform a "scan", in accordance with one embodiment of the invention.

Referring to FIG. 1, in other to combat the problem of counterfeit and gray goods, in one embodiment, an authentication application (AA) 10 is provisioned in a client device, such as a mobile phone 12. The AA 10 includes a scan function 52 (see FIG. 5) capable of scanning a computer readable code (CRC) 16 associated with a product 14. The product 14 may generally comprise an article of manufacture such as a pharmaceutical, clothing, alcohol, etc. More particularly, CRC 16 may be printed on or affixed to product packaging associated with the product 14.

In one embodiment, the CRC 16 may comprise an optically readable code akin to a QR code. Advantageously, the optically readable code may comprise information to authenticate the product 14. For example, said information may include a unique identifier 20 for the product 14 which can be used as part of a consumer-initiated authentication process.

Figure 2:
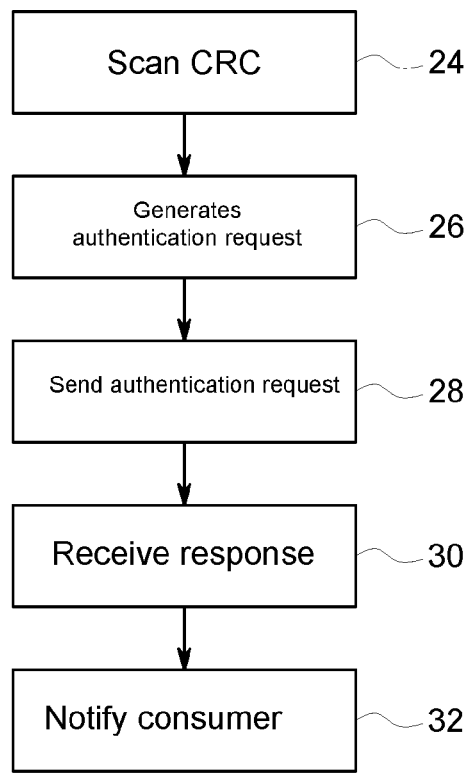
FIG. 2 shows a flowchart of a scan operation, in accordance with one embodiment of the invention.

Steps corresponding to the authentication process, in accordance with one embodiment of the invention are shown in the flowchart of FIG. 2. Referring to FIG. 2, the authentication process begins with a scan step 24, wherein the consumer 22 launches that AA 10, and activates a "scan" button of the authentication application to trigger the scan function 52. This causes a camera of the mobile phone 12 to be activated—an onscreen viewfinder for the camera is turned on. The consumer 22 then performs the user-actions of (a) pointing the camera at the CRC 16, and (b) shooting an image of the CRC 16. The image of the CRC 16 may be stored as image data in a memory of the phone 12.

At block 28, the authentication application 10 sends the authentication request to the authentication server configured to process said authentication request. Typically, the authentication server may be accessible via the World Wide Web, and may comprise a plurality of computing resources organized in accordance with a cloud-based computer architecture.

Figure 3:
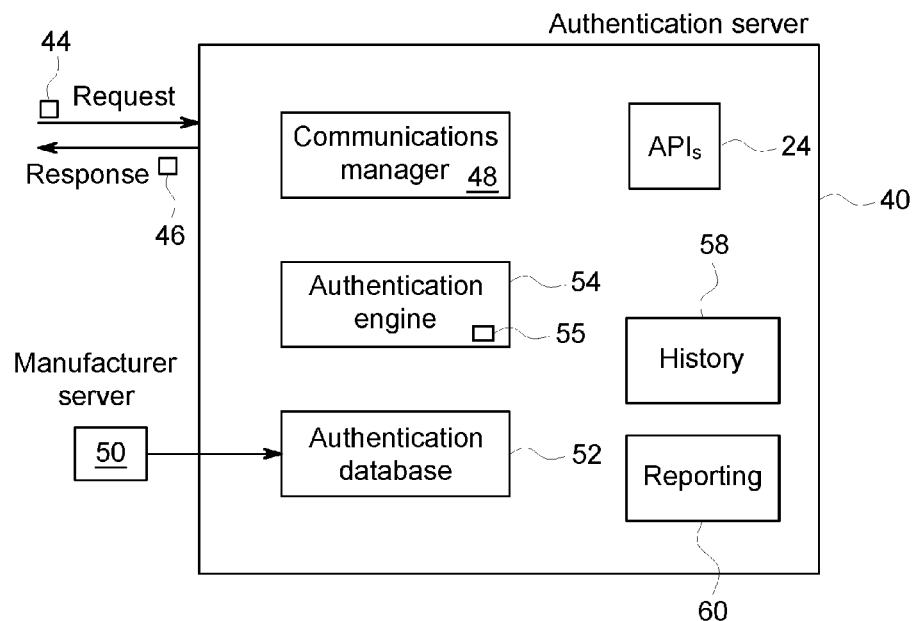
FIG. 3 illustrates the components of an authentication server, in accordance with one embodiment of the invention.
Figure 4:
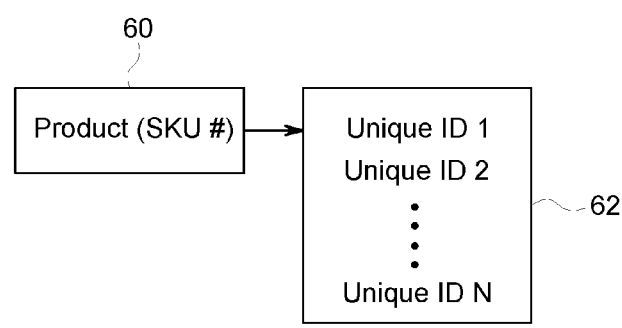
FIG. 4 illustrates an organizational structure for an authentication database, in accordance with one embodiment of the invention.

FIG. 3 shows the components of an authentication server 40, in accordance with one embodiment of the invention. The authentication server 40 and the phone 12 are communicatively coupled using well-known technologies. For example, the phone 12 may communicate with the authentication server 40 by means of a cellular network, which is used for transmission of the authentication request. The authentication request is indicated by reference numeral 44 in FIG. 3.

In response to receiving the authentication request 44, the authentication server 40 generates an authentication response 46 based on a server authentication process and transmits said response 46 to the phone 12. Thus, at block 30 the authentication application 10 receives the authentication response 46. At block 32, the authentication application 10 processes the response 46. Said processing may include extracting an authentication message from the authentication response 46 and displaying the authentication message to the consumer 22. Advantageously, the authentication message may comprise at least one indication that the product 14 is not authentic. More details about the indications included in the authentication message are provided later.

Referring now to FIG. 3 of the drawings, there is shown a high-level block diagram of some components of the authentication server 40, in accordance with one embodiment of the invention. As will be seen, the server 40 includes a communications manager 48 configured to send and receive electronic communications in accordance with various communications protocols from various entities/devices including phone 12, and a manufacturer computer 50. Functionally, the authentication server 40 orchestrates and performs the server authentication process, which will be described with reference to FIG. 7, in accordance with one embodiment. As will be seen, the authentication server 40 comprises an authentication database 52.

Figure 6:
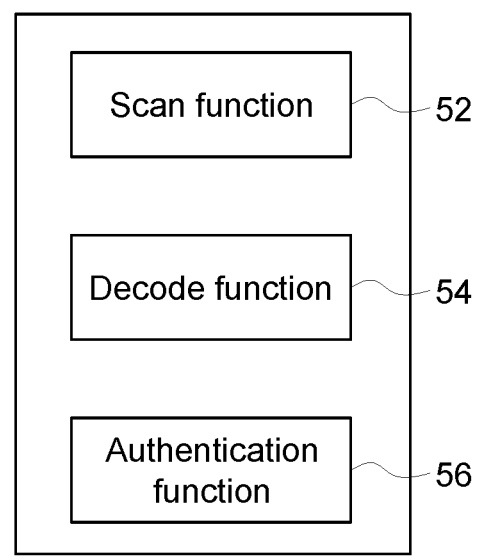
FIG. 6 indicates an organizational structure for an authentication database, in accordance with one embodiment of the invention.

FIG. 6 indicates an organizational structure for the authentication database 52, in accordance with one embodiment of the invention. Referring to FIG. 6, the database 52 comprises a plurality of products 60. Each product 60 may be uniquely identified by a SKU number. Each product 60 is mapped to a set 62 of unique identifiers. Each unique identifier in the set 62 may be generated by a manufacturer of the product or by some entity authorized to do so by said manufacturer. For example, in one embodiment the authentication server 40 may be configured to offer an authentication service to manufacturers to authenticate their products in accordance with the techniques disclosed herein. In the latter case, a service provider of said authentication service may be authorized by a manufacturer to generate the set of unique identifiers for a given product of said manufacturer.

Various techniques may be used to generate the set of unique identifiers, and one of ordinary skill in the art would understand that each unique identifier must have sufficient bits to reduce the likelihood of a counterfeiter been able to replicate a number from the set 62. Thus, for example, in one embodiment each random number corresponding to a unique identifier in the set 62 may comprise 128 bits which would make about $3.4 \times 10^{38}$ random numbers available for inclusion in the set 62. In this case, because the number of random numbers available for use as unique identifiers is very high, the likelihood of a counterfeiter being able to correctly identify the numbers in the set 62 is very small.

Figure 5:
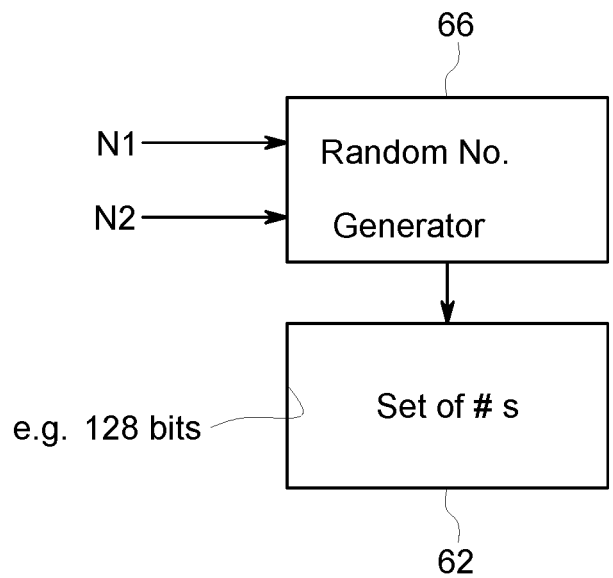
FIG. 5 illustrates a process to generate a set of random numbers, in accordance with one embodiment of the invention.

FIG. 5 illustrates a process, in accordance with one embodiment, to generate the set of random numbers 62. As will be seen, the process includes inputting two numbers N1 and N2 into the random number generator (RNG) 66. The number N1 specifies the number of digits that a random number output by the random number generator 66 must have. The number N2 specifies the number of random numbers within the set 62 of random numbers. For example, a manufacturer of lipstick may instruct a service provider implementing the authentication techniques and systems disclosed herein to generate a million random numbers (this number corresponds to the number N2) to be used in the authentication of lipsticks made by the manufacturer. Thus, the set 62 will comprise one million random numbers. In one embodiment, the service provider may operate on an on-demand basis to generate random numbers to be used in the authentication of various products by various manufacturers. This means that when a manufacturer requires a certain number of random numbers, then said manufacturer will make your request to the service provider to generate that number of random numbers.

Once the random numbers are generated, there are various use cases that may be employed in order to produce the computer-readable codes that each embody a random number. Under the first use case, random numbers are given to the manufacturer who may then oversee operations to place the random numbers on product packaging. In one embodiment, an encoder may be provided to the manufacturer to enable the manufacturer to encode each random number in a computer-readable code. Each computer-readable code may be printed on a sticker or label which may be affixed to product packaging.

Under the second use case, under the authority of the manufacturer, the authentication service provider may oversee operations to place the random numbers on product packaging for the products associated with the manufacturer. For example, in the latter case the authentication service provider may liaise directly with a factory charged with the task of producing packaging that is to bear computer readable codes disclosed herein.

Under yet a further use case, the third party service provider may produce a set of computer-readable codes, each encoding a random number produced in accordance with the techniques disclosed herein. The computer-readable codes may be stored in a data file wishes and supplied to the manufacturer or the factory associated with the manufacturing of the product on which the codes must be placed. Thus, the manufacturer or the factory manages the process of getting the computer-readable codes on the relevant packaging.

Figure 7:
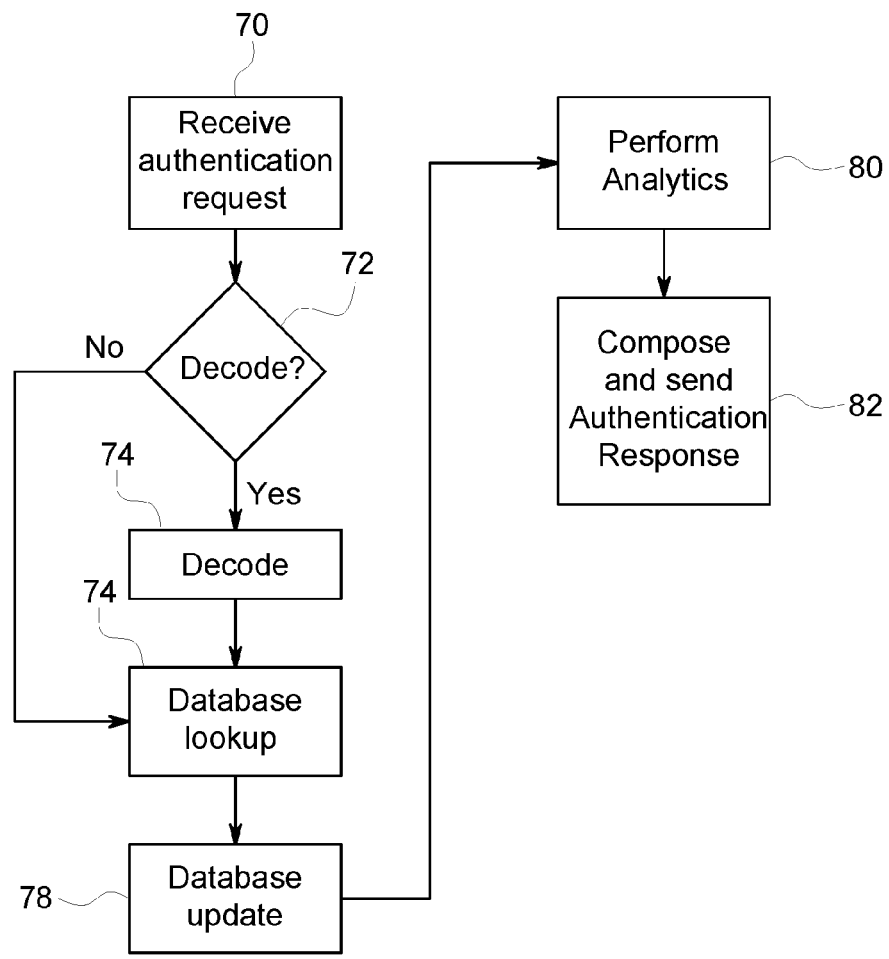
FIG. 7 shows a flowchart of operations corresponding to a server authentication process, in accordance with one embodiment of the invention.
Figure 8:
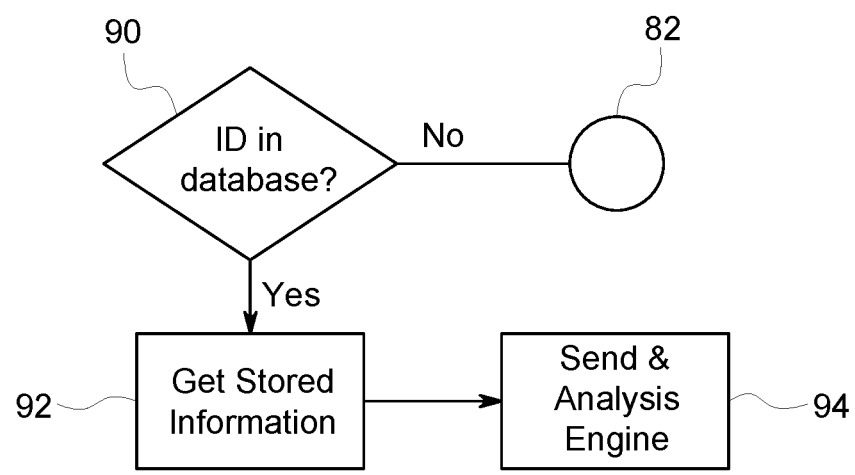
FIG. 8 shows a flowchart for a database lookup operation, in accordance with one embodiment of the invention.

Referring again to FIG. 3 of the drawings, it will be seen that the authentication server 40 also includes an authentication engine 54. In one embodiment, the authentication engine 54 is configured to run the server authentication process which will be described with reference to FIG. 7. In one embodiment, the authentication engine 54 may also include an analytics engine 55 to perform certain analytic functions in order to generate guidance as to whether a particular product is likely counterfeited or not. Referring to FIG. 7, there is shown a flowchart of operations corresponding to the server authentication process, in accordance with one embodiment of the invention. The server authentication process begins with block 70, wherein the authentication request 44 is received from the client device. At block 72, control forks either to a decode block 74, or to a database look up block 76. Basically, if the authentication request includes the unique identifier 20 then control passes is directly to the database look up block 76. However, if instead of having the unique identifier 20, the authentication request includes the original image of the computer-readable code, then the decode block 74 is executed in order to decode the computer-readable code thereby to extract the unique identifier 20. The processing under the database look up block 76, in one embodiment, may include the steps shown in FIG. 8. Referring to FIG. 8, at block 90 a determination is made as to whether the unique identifier 20 is in the authentication database 50. If the unique identifier 20 is not in the database 50, then control process to block 82 (see FIG. 7), otherwise control passes to block 92. The block 92, in one embodiment, is responsible for retrieving stored information about the product associated with the unique identifier 20 the found in the authentication database 50. If more details about said stored information will be provided later. At block and 94, the retrieved stored information is passed to the analytics engine 55 which then executes an analytics process in order to generate guidance as to whether or not the product associated with the unique identifier 20 is counterfeited or not, as will be explained later.

Referring now to FIG. 9, of the drawings, there is shown an example of the stored information about a product mentioned above. As will be seen, said stored information includes columns 100-114. Moving from left to right, the column 100 records the unique IDs, the column 102 records product ID's, for example in the form of SKU numbers, the column 104 records product descriptions, the column 106 stores at least one image associated with the product, the column 108 records the number of scans associated with each unique identifier, the column 110 records information the consumer responsible for a particular scan; the column 112 records information on the location at which the scan was made; and the column 114 records the time stamp to indicate the time and which the scan was performed.

In one embodiment, a manufacturer operates a manufacturer computer 50 which interfaces with the authentication database 52 by means of a suitable API whereby said manufacturer computer 50 may provision some of the stored information shown in FIG. 9. For example, the manufacturer may provide the product descriptions, and the product images. Information regarding the number of scans, who initiated the scan, the location of the scan, and the time of the scan may be extracted from information included in the authentication request. In one embodiment, the identity of the person making the scan is determined based on a customer ID assigned to the customer 22 to as part of signup process with the authentication service provider. The authentication application 10 may be configured to include the customer ID in the authentication request transmitted to the authentication server. To determine the number of scans, maintains a counter which is implemented each time a scan is received with a particular unique identifier 22.

In one embodiment, the analytics engine 55 analyzes the stored information, in order to provide guidance as to whether a particular product is likely counterfeited or not. For example, this guidance may include an indication that the unique identifier 20 associated with the product authentication request 44 exists in the authentication database 52. Suppose that the product associated with the product identifier 20 comprises a particular type of lipstick. In one embodiment, analysis of the stored information associated with the product (lipstick) may include making inferences as to whether the lipstick is counterfeited or not based on analysis of the number of scans, the person making each scan, the location of the scans, the time stamps associated with each scan, and the nature of the product in respect of which the authentication request is being made. For example, if the number of scans is a zero one can conclude that the list it is not counterfeited. The guidance regarding whether the particular product associated with the unique identifier 20 in the database 52 is likely counterfeited not may be influenced by the number of scans associated with the unique identifier 20, and the location of each scan. For example consider FIG. 10 which shows a table 119 recording each scan associated with a product. The table 119 may be provisioned in the authentication database 52 and includes a column 120 wherein a number or ID is assigned to each scan, and a column 122 to record the location of each scan identified in the column 120. The location of the scan may be expressed in different ways such as by a store ID for a store at which the scan was initiated, or by a Zip-code associated with said store. To determine the location of a scan, location sensor data generated by the mobile phone 12 may be used. The table 119 may be used in various ways to determine whether a product is likely counterfeited or not. For example, ordinarily, a high number of scans for a product might be an indication that the product is counterfeited. However, if the locations of the scans are all the same then the inference can be made that one is dealing with the situation where the product is likely on a shelf within a store, where it is being scanned by potential customers. This would explain the multiple scans for the product. However, if the scans happen to be from different locations then this may be regarded as an indication that at least one of the scans is associated with a counterfeited product.

Several use cases relating to scans will now be described:

Use case 1: for this use case, the unique identifier 20 is in the authentication database 52, but there are no previous scans recorded against the identifier. The guidance for this use case might include information about the product associated with the unique identifier 20. Said information might include a description of the product, and any image associated with the product and may be used by the consumer to help said customer to determine if the product is counterfeited or not. For example, if the product description or its image does not match the actual product that was scanned, then the consumer would understand that the product is likely counterfeited.

Use case 2: there are multiple scans associated with the unique identifier 20, in the authentication database 52. For this use case, the location data will be analyzed in order to provide the guidance, as described above.

Use case 3: there are multiple scans, but other information is available in order to provide guidance on whether the product associated with the multiple scans is likely counterfeited or not. For example, consider the case where the product is an expensive handbag by a brand name manufacturer. If the scan data indicates that the handbag was scanned at two different locations at the same time, then one of the handbag scans is likely to be associated with a counterfeited product. However, if the scan data indicates that the handbag was scanned at different locations at different times, then the handbag might not necessarily be counterfeited as the subsequent scan might have been initiated by a prospective purchaser of the handbag as a second hand item. The nature of the product may also play a role in distinguishing whether the product is counterfeited or not. For example, if the product is known to likely have a secondhand market, then subsequent scans may be explained as being scans by a subsequent purchaser. However, not all products are likely to have a secondhand market. For example, the products such as powdered milk is not likely to be sold secondhand. Thus, in one embodiment the analytics engine can use information about subsequent scans, and the nature of the product being scanned in order to assess whether the product is being counterfeited.

In some embodiments, additional information may be provided to a consumer in an authentication response. For example, such additional information may include a product's expiration date. This might be useful in some markets and for some products. For example, in developing markets products such as pharmaceuticals that are expired are sometimes offered for sale after the expiration date. Thus, information and the products expiration date would be useful to a consumer. In some cases, the additional information may include the properties of a product. Again, in the case of a pharmaceutical, say in the form of a pill it could be useful for a consumer to know the color, shape, smell and other characteristics so as to avoid purchasing a counterfeited product.

In one embodiment, in order to assist manufacturers to combat the problem of counterfeit goods, the authentication server may be configured to maintain a history database 58 for storing information about a class of authentication requests for which no matching unique identifier exists in the authentication database 52. The information stored in the database 58 may include for each authentication request in said class, an image of the product associated with the authentication request, and the location of the scan. In one embodiment, the authentication server may be configured analyze the data in the case to database 58 to identify patterns that may assist identifying counterfeit goods. For example, if there are multiple scans in the database 58 from a single location and a retailer associated with the location may be flagged as dealing in counterfeited goods This information may be reported to a manufacturer by a reporting module 60 (see FIG. 3), and may be used by the manufacturer to proactively take steps to stop the sale of counterfeit goods by said retailer.

In some cases manufacturers may provision the database 52 with information on the markets wherein a product may be legitimately sold. For example, the particular product of a manufacturer may legitimately be sold in a first market, say India, but not in a second market, say Australia. This information may be used to detect cases where a product is legitimate, but not authorized for sale in a market. Information about the sale of the manufacturer's goods in unauthorized markets may be reported to a manufacturer by the reporting module 60, in accordance with one embodiment of the invention.

Thus, embodiments of the invention involve printing a randomly assigned product ID number on product packages of authorized manufacturers as a computer-readable code. As printed, the computer-readable code is identifiable by consumers and readable by ubiquitous, connected, and consumer-owned devices. The techniques disclosed herein are capable of collecting additional data points at the time of reading/scanning (such additional information includes, but is not limited to time, location, corresponding device ID, user ID with associated prior user-behavior, etc.) In one embodiment, the randomly assigned product ID number is linked to a private, non-publicly accessible database comprising product specific information (e.g. packaging photo, manufacturer/product names, package size, etc.), sufficient to indicate to consumers whether a scanned product ID matches an actual product and its packaging. The techniques disclosed herein may be used to identify invalid product IDs as counterfeit and products without product ID as pass offs, while flagging user IDs indicative of counterfeit or otherwise fraudulent activity. An example of an activity that is so indicative may include the case where someone repeatedly tries to access the system in order to identify or validate product ID numbers and linked product SKUs. In some embodiments, the techniques disclosed herein may be advantageously be used to identify retailers who participate in the distribution of counterfeit products.

The features/functions of the platform and client app described above may be implemented as modules. As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures. Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

A computing server might also include one or more memory modules, simply referred to herein as main memory. For example, preferably random access memory (RAM) or other dynamic memory, might be used for storing information and instructions to be executed by processor. Main memory might also be used for storing temporary variables or other intermediate information during execution of instructions to be executed by processor. Computing module might likewise include a read only memory ("ROM") or other static storage device coupled to bus for storing static information and instructions for processor.

The database module might include, for example, a media drive and a storage unit interface. The media drive might include a drive or other mechanism to support fixed or removable storage media. For example, a hard disk drive, a floppy disk drive, a magnetic tape drive, an optical disk drive, a CD, DVD or Blu-ray drive (R or RW), or other removable or fixed media drive might be provided. Accordingly, storage media might include, for example, a hard disk, a floppy disk, magnetic tape, cartridge, optical disk, a CD, DVD or Blu-ray, or other fixed or removable medium that is read by, written to or accessed by media drive. As these examples illustrate, the storage media can include a computer usable storage medium having stored therein computer software or data.

In alternative embodiments, the database module might include other similar instrumentalities for allowing computer programs or other instructions or data to be loaded into computing module. Such instrumentalities might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module.

The communications module might include various communications interfaces such as an Ethernet, network interface card, WiMedia, IEEE 802.XX or other interface), or other communications interface. Data transferred via communications interface might typically be carried on signals, which can be electronic, electromagnetic (which includes optical) or other signals capable of being exchanged by a given communications interface. These signals might be provided to communications interface via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for authenticating an article of manufacture, said method comprising:
    generating a set of unique identifiers to be associated with a plurality of articles of manufacture;
    associating on a one-to-one basis a single identifier from said set with a single instance of the article of manufacture from said plurality of articles of manufacture;
    maintaining an authentication server to perform at least one authentication operation in response to receiving an authentication request from a client device;
    enabling each of a plurality of client devices to generate an authentication request to set authentication server, wherein said authentication request is to authenticate a particular instance of an article of manufacture from said plurality of articles of manufacture,
    responsive to receiving said authentication request from said client device, performing by said authentication server said at least one authentication operation comprising transmitting a request to an authentication database provisioned with manufacturer-derived authentication information to enable authentication of the particular instance of the article of manufacture; and;
    transmitting a response to said application request from said client device to said client device.

2. The method of claim 1, further comprising maintaining said authentication database in a secure manner wherein access thereto by the general public is not allowed.

3. The method of claim 2, wherein associating each identifier with the instance of the article of manufacture comprises encoding said identifier as a computer-readable code.

4. The method of claim 3, wherein said computer-readable code is an optically-readable code.

5. The method of claim 4, wherein associating each identifier with an instance of the article of manufacture comprises associating the optically-readable code for the identifier with the instance of the article of manufacture.

6. The method of claim 4, wherein associating the optical life of the code for the identifier with the instance of the article of manufacture comprises placing the optically-readable code on a label, which is subsequently associated with the article of manufacture.

7. The method of claim 1, wherein the manufacturer-derived authentication information comprises manufacturer-images associated with the article of manufacture.

8. The method of claim 1, wherein said authentication request comprises information capable of identifying a particular location where said authentication request originated.

9. The method of claim 8, wherein said authentication operation is performed by an authentication engine component of the authentication server configured to transform said particular location into a store location thereby to identify a legitimate vendor of the article of manufacture.

10. The method of claim 1, wherein said authentication response comprises additional information beyond authentication information.

11. The method of claim 10, wherein said additional information comprises an expiration date associated with the article of manufacture.

12. The method of claim 10, wherein said additional information comprises information to direct proper use of said article of manufacture.

13. A system for authentication an article of manufacture, said system comprising an authentication server communicably connected to a client device and a manufacturer, wherein the system is configured to:

generate a set of unique identifiers to be associated with a plurality of articles of manufacture;

associate on a one-to-one basis a single identifier from said set with a single instance of the article of manufacture from said plurality of articles of manufacture;

perform at least one authentication operation in response to receiving an authentication request from a client device;

enable each of a plurality of client devices to generate an authentication request to set said authentication server, wherein said authentication request is to authenticate a particular instance of an article of manufacture from said plurality of articles of manufacture, responsive to receiving said authentication request from said client device, perform by said authentication server said at least one authentication operation comprising transmission of a request to an authentication database provisioned with manufacturer-derived authentication information to enable authentication of the particular instance of the article of manufacture; and transmit a response to said application request from said client device to said client device.

14. The system of claim 13, further configured to maintain said authentication database in a secure manner wherein access thereto by the general public is not allowed.

15. The system of claim 14, wherein association of each identifier with the instance of the article of manufacture comprises encoding said identifier as a computer-readable code.

16. The system of claim 15, wherein said computer-readable code is an optically-readable code.

17. The system of claim 16, wherein the association of each identifier with an instance of the article of manufacture comprises association of the optically-readable code for the identifier with the instance of the article of manufacture.

18. The system of claim 13, wherein the manufacturer-derived authentication information comprises manufacturer-images associated with the article of manufacture.

19. The system of claim 13, wherein said authentication request comprises information capable of identifying a particular location where said authentication request originated.

* * * * *